US012705396B2

(12) United States Patent
Lane

(10) Patent No.: US 12,705,396 B2
(45) **Date of Patent: *Aug. 11, 2026**

(54) PERSONAL INFORMATION REDACTION AND VOICE DEIDENTIFICATION

(71) Applicant: Twilio Inc., San Francisco, CA (US)

(72) Inventor: Ian Richard Lane, Sunnyvale, CA (US)

(73) Assignee: Twilio Inc., San Francisco, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/955,124

(22) Filed: Nov. 21, 2024

(65) Prior Publication Data

US 2025/0086317 A1 Mar. 13, 2025

Related U.S. Application Data

(63) Continuation of application No. 17/650,968, filed on Feb. 14, 2022, now Pat. No. 12,189,817.

(51) Int. Cl.

| | |
|---|---|
| ***G06F 21/62*** | (2013.01) |
| ***G10L 15/06*** | (2013.01) |
| ***G10L 15/22*** | (2006.01) |
| ***G10L 15/26*** | (2006.01) |
| ***G10L 21/003*** | (2013.01) |

(52) U.S. Cl.

CPC ........ *G06F 21/6254* (2013.01); *G10L 15/063* (2013.01); *G10L 15/22* (2013.01); *G10L 15/26* (2013.01); *G10L 21/003* (2013.01)

(58) Field of Classification Search

None

See application file for complete search history.

(56) References Cited

U.S. PATENT DOCUMENTS

| | | | | |
|---|---|---|---|---|
| 5,729,694 | A | 3/1998 | Holzrichter et al. | |
| 9,058,813 | B1 | 6/2015 | Blanksteen | |
| 10,468,026 | B1 | 11/2019 | Newman et al. | |
| 10,650,827 | B2 | 5/2020 | Zuo et al. | |
| 12,170,082 | B1 * | 12/2024 | Koledin | H04M 7/006 |

(Continued)

FOREIGN PATENT DOCUMENTS

| | | |
|---|---|---|
| CN | 115136519 | 9/2022 |

OTHER PUBLICATIONS

"U.S. Appl. No. 17/650,968, Non Final Office Action mailed Feb. 22, 2024", 40 pgs.

(Continued)

*Primary Examiner* — Bassam A Noaman
(74) *Attorney, Agent, or Firm* — Schwegman Lundberg & Woessner, P.A.

(57) ABSTRACT

A company may want to give access to voice conversations (e.g., a support call) to some users for review and analysis. However, the conversations may include personally identifiable information (PII), and the company wants to protect customer information while still allowing the use of the data. In one aspect, techniques are presented for receiving audio from the conversation and obtaining a redacted version of the audio, which does not include the PII, directly from the audio without having to rely on analyzing the transcript of the conversation first. Further, the modified audio may be deidentified to change the voice of the customer in the resulting audio in order to protect the customer identity.

20 Claims, 9 Drawing Sheets

(56) References Cited

U.S. PATENT DOCUMENTS

| | | | |
|---|---|---|---|
| 12,189,817 | B2 | 1/2025 | Lane |
| 2019/0377901 | A1 | 12/2019 | Balzer et al. |
| 2020/0005773 | A1 | 1/2020 | Schmidt et al. |
| 2021/0056270 | A1 | 2/2021 | Farhan et al. |
| 2021/0125615 | A1 | 4/2021 | Medalion et al. |
| 2022/0130372 | A1 | 4/2022 | Obaidi |
| 2022/0199093 | A1 * | 6/2022 | Ramadas ............ G06F 21/6254 |
| 2023/0098137 | A1 | 3/2023 | Ehlen et al. |
| 2023/0259653 | A1 | 8/2023 | Lane |

OTHER PUBLICATIONS

"U.S. Appl. No. 17/650,968, Examiner Interview Summary mailed May 14, 2024", 2 pgs.
"U.S. Appl. No. 17/650,968, Response filed May 21, 2024 to Non Final Office Action mailed Feb. 22, 2024", 13 pgs.
"U.S. Appl. No. 17/650,968, Notice of Allowance mailed Aug. 23, 2024", 12 pgs.
"U.S. Appl. No. 17/650,968, 312 Amendment filed Nov. 20, 2024", 8 pgs.
"U.S. Appl. No. 17/650,968, PTO Response to Rule 312 Communication mailed Dec. 2, 2024", 2 pgs.

* cited by examiner

OUTPUT SCHEMA

602

| | |
|---|---|
| No Classes: | i live in north hampton massachusetts |
| 13 Classes: | I live in <LOCATION> north hampton </LOCATION> <STATE> massachusetts </STATE> |
| 1 Class: | i live in <PII> north hampton massachusetts </PII> |
| NE-Tag: | i live in <LOCATION> <STATE> |
| PII-Tag: | i live in <PII> |

FIG. 6

PERSONAL INFORMATION REDACTION AND VOICE DEIDENTIFICATION

CLAIM OF PRIORITY

This Application is a Continuation of U.S. application Ser. No. 17/650,968, filed Feb. 14, 2022, which is hereby incorporated by reference in its entirety.

TECHNICAL FIELD

The subject matter disclosed herein generally relates to methods, systems, and machine-readable storage media for redacting Personally Identifiable Information (PII).

BACKGROUND

The amount of data collected by businesses and government keeps growing, and this data can be useful to solve business and other types of problems, such as using machine-learning (ML) models that find correlations in the data to help estimate possible outcomes.

However, data often contains Personally Identifiable Information (PII), which is any data that can be used to identify a specific individual. Examples of PII include name, Social Security numbers, mailing address, email address, phone number, Internet Protocol (IP) address, login identifiers (IDs), Global Positioning System (GPS) information, etc.

Protecting privacy of people is an important concern, so before the data is used for business or government purposes, there may be a need for the data to be anonymized to enable the use of the data without compromising privacy.

BRIEF DESCRIPTION OF THE DRAWINGS

Various of the appended drawings merely illustrate example embodiments of the present disclosure and cannot be considered as limiting its scope.

FIG. 6 illustrates a sample output schema.

DETAILED DESCRIPTION

Example methods, systems, and computer programs are directed to redacting Personally Identifiable Information (PII) and deidentifying voice in a conversation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A company may want to give access to voice conversations (e.g., a support call) to some users for review and analysis. However, the conversations may include PII, and the company wants to protect customer information while still allowing the use of the data. In one aspect, techniques are presented for receiving audio from the conversation and obtaining a redacted version of the audio, which does not include the PII, directly from the audio without having to rely on analyzing the transcript of the conversation first. Further, the modified audio may be deidentified to change the voice of the customer in the resulting audio in order to protect the customer identity.

One general aspect includes a method that includes an operation for training a machine-learning algorithm with a training set to obtain an encoder. The training set comprises audio data, transcript data, and redacted-transcript data for a plurality of conversations. The method further includes operations for training two or more decoders with the training set, and for processing, by the encoder, a conversation audio to generate a hidden representation of the conversation audio. Further, the method includes an operation for processing the hidden representation of the conversation audio by the two or more decoders. Each decoder generates an output that is a representation of the conversation audio. Further, the method includes causing presentation of at least one output from the two or more decoders in a user interface.

Figure 1:
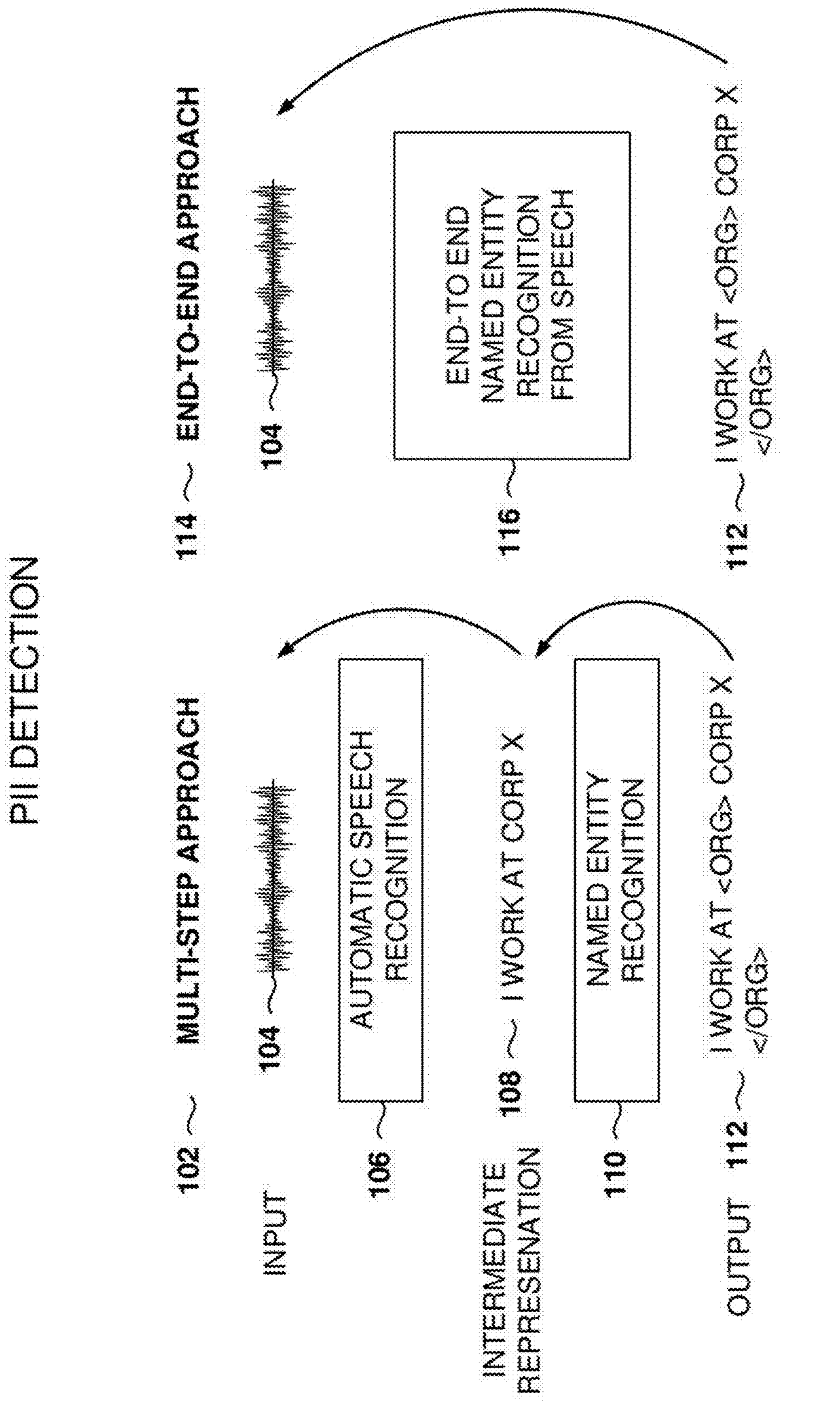
FIG. 1 illustrates different approaches for detecting PII, according to some example embodiments.

FIG. 1 illustrates different approaches for detecting PII, according to some example embodiments. When the data with user information is anonymized, the result is anonymized data that does not have information in the data that can lead others to user private information.

Data anonymization is the process of removing personal information from raw data. The resulting anonymized data cannot be associated with any individual or company. PII may include any information that can lead to the identification of an individual, a group of individuals, a company, or some other organization. The personal data may include direct identifiers, such as the person's name, last name, email address, phone number, Social Security number, etc. The personal data may also include indirect identifiers such as date of birth, gender, ZIP code, etc. Sensitive personal data may include data that could cause harm or embarrassment to an individual, such as political beliefs, genetic data, health information, sexual orientation, etc. For businesses, sensitive data may include any data that may cause a threat to the company if discovered by others, such as trade secrets, customer information, etc.

When personal data is modified such that the individual is no longer identifiable, the modified data is no longer considered personal data. Further, redacting is the process of removing confidential information from the data, such as names, phone numbers, addresses, etc. Embedding is the process of converting the data into a multidimensional vector, such as a vector containing bit values or integer numbers representing the data.

One problem for the use of user data is when a company wants to analyze audio recordings from their customers (e.g., a support call). Further, the company wants to let a person listen to the audio recordings in order to check the automatically-generated transcripts to determine where the automatic-transcription process made errors in order to make corrections to the transcripts.

In some cases, the company does not want to let the reviewer access the embedded PII, such as when using outside contractors to review the transcripts, but still wants to allow for the correction of the transcripts in areas without PII.

In some example embodiments, the redaction process uses a neural network to take the audio of the conversation as an input and then generate output with the audio of the conversation without PII. Further, the output audio may be de-identified to replace the voice of the user with a neutral voice to hide this personal information of the user, avoiding the possibility that the voice of the user may be recognized.

Voice de-identification requires that, after the voice transformation, the listener cannot easily determine the identity of the original speaker. Further, after the voice transformation, the speech in the audio must remain clear and intelligible for human reviewers.

The first approach to redaction is a multi-step approach 102 that includes multiple operations. First, the input audio 104 is analyzed by a program for automatic speech recognition 106, which outputs an intermediate representation that includes the transcript of the input audio 104. In a second operation, a named-entity recognition program 110 analyzes the intermediate representation 108 to determine which segments of the transcript include PII. The result is output 112 that includes text with tags or markers identifying the location of the PII.

In the illustrated example, the transcript of the conversation includes the sentence "I work at Corp X," where "Corp X" is the name of a company. The named-entity recognition program 110 produces an output "I work at <ORG> CorpX </ORG>" where the markers <ORG> and </ORG> delimit the location of the PII found, in this case referring to the name of an organization. Other types of PII may use different tags.

The multi-step approach 102 utilizes two different programs (e.g., ML models): the automatic speech recognition 106 and the named-entity recognition program 110. The programs are independent and are trained independently of each other.

The second approach is an end-to-end approach 114 that uses one operation to generate the output 112. An end-to-end named-entity recognition program 116 uses the input audio 104 and produces the output 112. Therefore, the output is generated directly without having to use multiple steps. Only one program has to be trained instead of two. This reduces the effort and resources necessary to provide the solution, e.g., only one model has to be maintained, avoid problems caused by the interactions of the two programs, only one training operation needed, etc.

Figure 2:
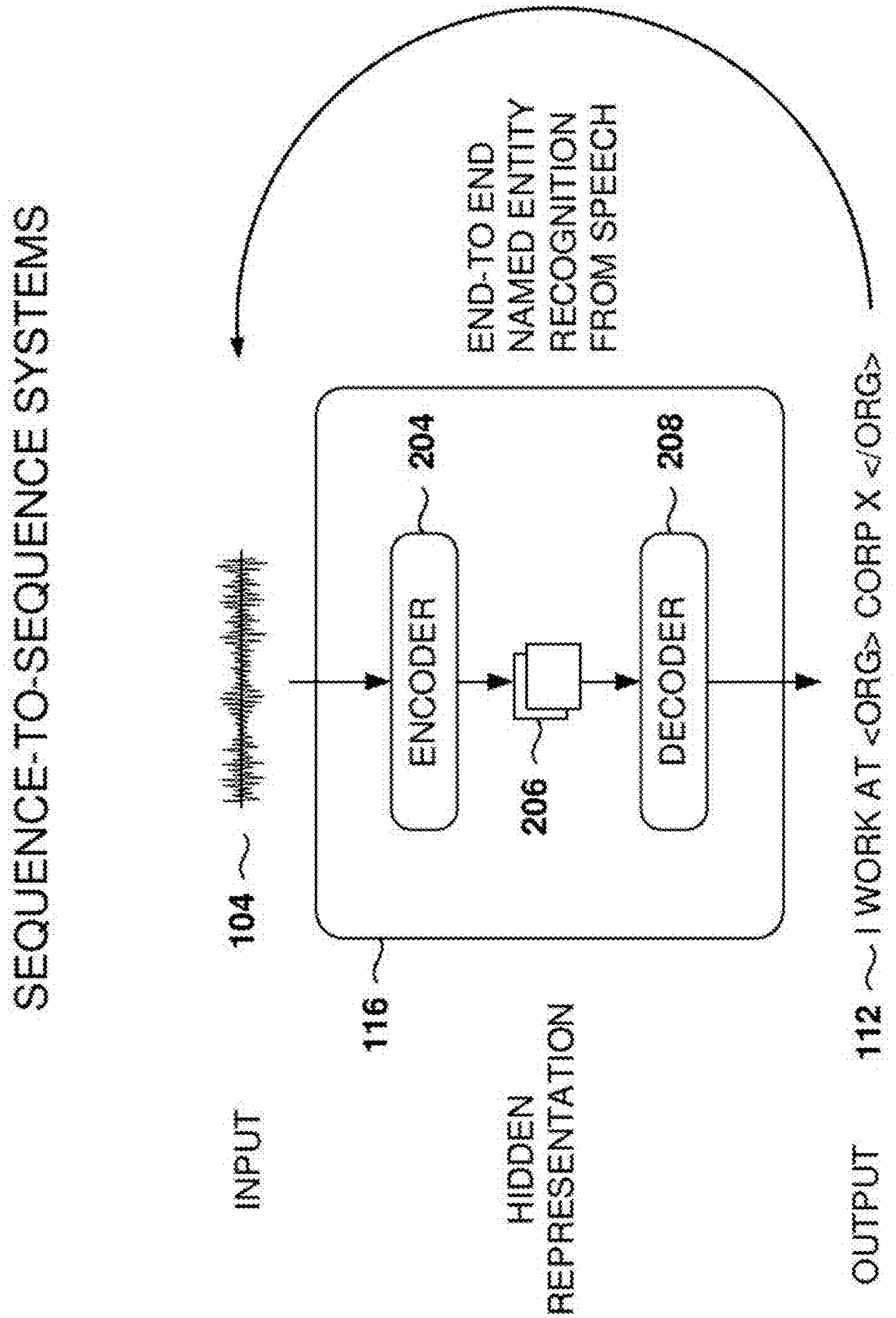
FIG. 2 illustrates the use of encoders and decoders for detecting PII, according to some example embodiments.

FIG. 2 illustrates the use of encoders 204 and decoders 208 for detecting PII, according to some example embodiments. In some example embodiments, the end-to-end named-entity recognition program 116 includes an encoder 204 and a decoder 208.

The encoder 204 takes the input audio 104 as input and generates a hidden representation 206 of the input audio. The hidden representation 206 contains the information required to transcribe the audio, identify PII, and generate the PII tags for the transcript. In some example environments, the hidden representation 206 is a multidimensional vector containing numbers. Hidden representations represent the machine-readable data representations learned from a neural network's hidden layers. The output of an activated hidden node, or neuron, is used for classification or regression at the output layer, but the representation of the input data, regardless of later analysis, is called hidden representation.

The decoder 208 takes the hidden representation 206 as an input and generates the output 112 for the transcript and the PII tags. Additionally, other decoders may use the hidden representation 206 and generate the transcript from the audio and redacted audio without PII, as discussed in more detail below with reference to FIG. 4.

Figure 3:
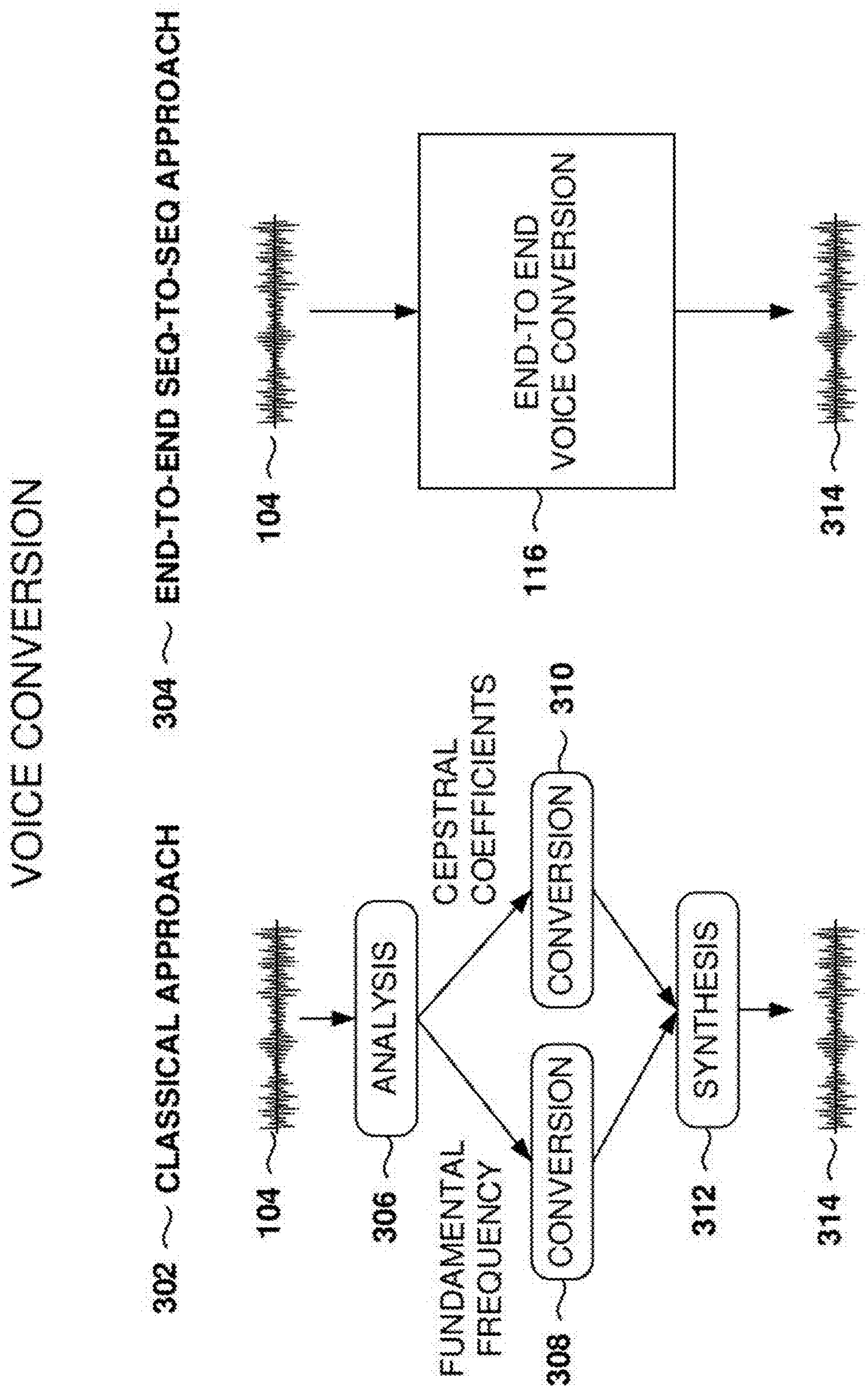
FIG. 3 is a comparison of techniques for voice conversion, according to some example embodiments.

FIG. 3 is a comparison of techniques for voice conversion, according to some example embodiments. Voice conversion is the process to modify the audio of a conversation to replace the voice of one speaker with the voice from a different speaker while retaining the linguistic content from the source speaker, e.g., some words spoken.

In the classical approach 302, the input audio 104 is analyzed by an analysis program 306 that generates fundamental frequencies and cepstral coefficients. The fundamental frequencies are processed by a conversion program 308 and the cepstral coefficients by a conversion program 310. The outputs of the conversion program 308 and the conversion program 310 are processed by a synthesis program 312 that generates the voice conversion 314.

In the end-to-end approach 304, also referred to as end-to-end sequence-to-sequence approach, the end-to-end named-entity recognition program 116 uses the input audio 104 and generates directly the voice conversion 314. The voice conversion 314 is performed in a single operation.

In some example embodiments, redaction and voice conversion are combined and the voice conversion 314 includes the changed voice and the PII content is eliminated from the input audio 104.

In some example embodiments, a plurality of different voices is available as the target voice of the conversion. Oftentimes, a male voice is replaced with a male voice and a female voice is replaced with a female voice, but gender change may also be utilized.

Figure 4:
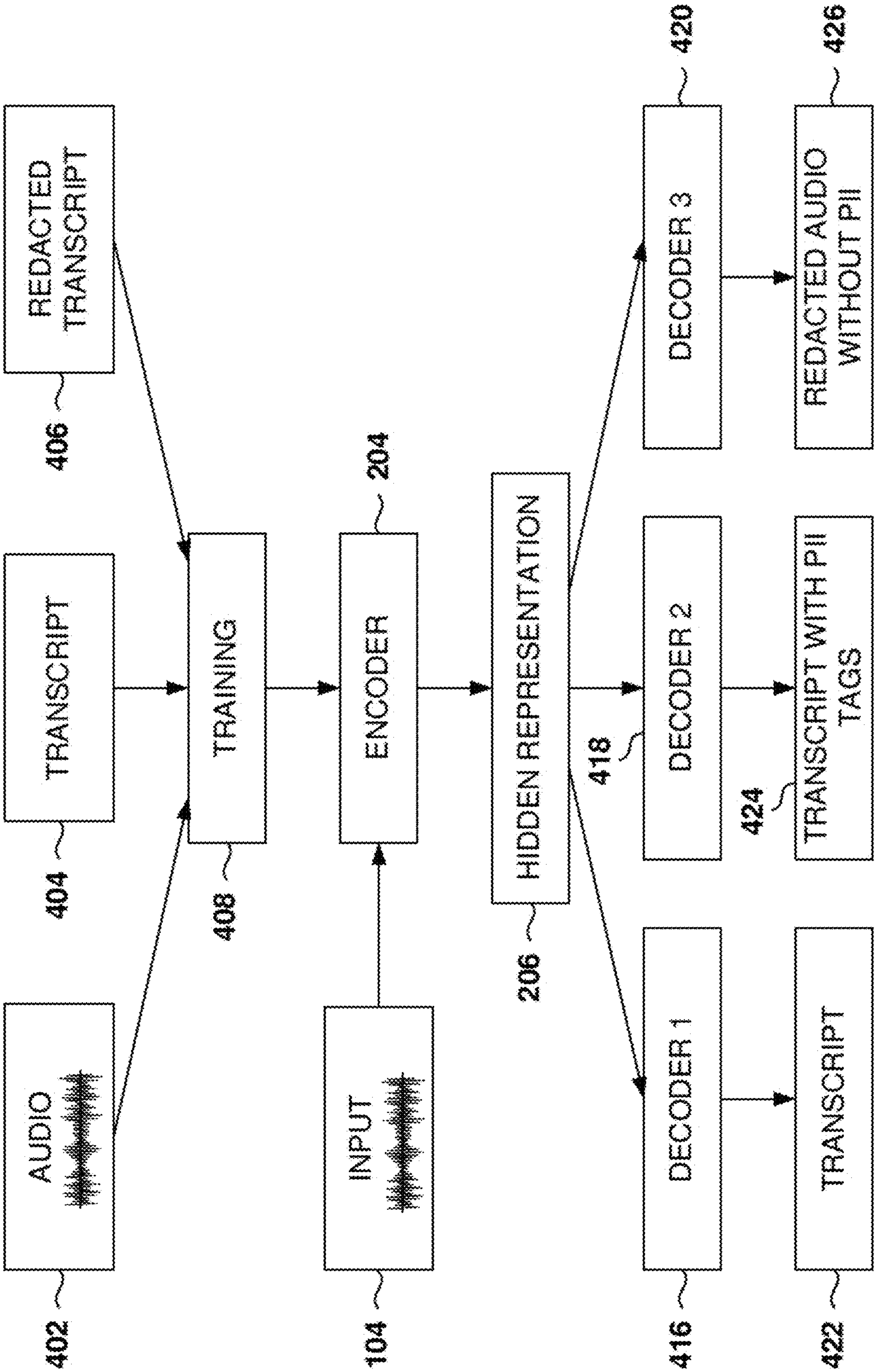
FIG. 4 illustrates the use of one encoder and three different decoders for different types of conversation analysis, according to some example environments.

FIG. 4 illustrates the use of one encoder and three different decoders for different types of conversation analysis, according to some example environments. The training 408 of the machine-learning (ML) algorithm includes training data for a plurality of conversations. For each conversation, the training data includes one or more of audio 402 of the conversation, a transcript 404 of the conversation, and a redacted transcript 406 without the identified PII. In some example embodiments, instead of the redacted transcript 406, a transcript with the PII identified inside may also be utilized.

The result of the training 408 is the encoder 204. When the encoder 204 is used during processing of the input audio 104, the encoder 204 generates a hidden representation 206.

The hidden representation 206 can be used by multiple encoders to generate multiple outputs. That is, the same hidden representation 206 may be used by three different decoders 416, 418, 420.

Decoder 416 takes the hidden representation 206 as input and generates a transcript 422 of the input audio 104. Decoder 418 takes the hidden representation 206 as input and generates a transcript with PII tags 424, that is, the transcript plus identifiers of the location of the PII within the transcript.

Further, decoder 420 takes the hidden representation 206 as input and generates a redacted audio 426 without PII that corresponds to the input audio 104 without the PII, that is, the sections of the conversation with PII are blocked (e.g., replaced by beeps or silence). In some example embodiments, decoder 420 may also change the voice of at least one speaker.

Figure 5:
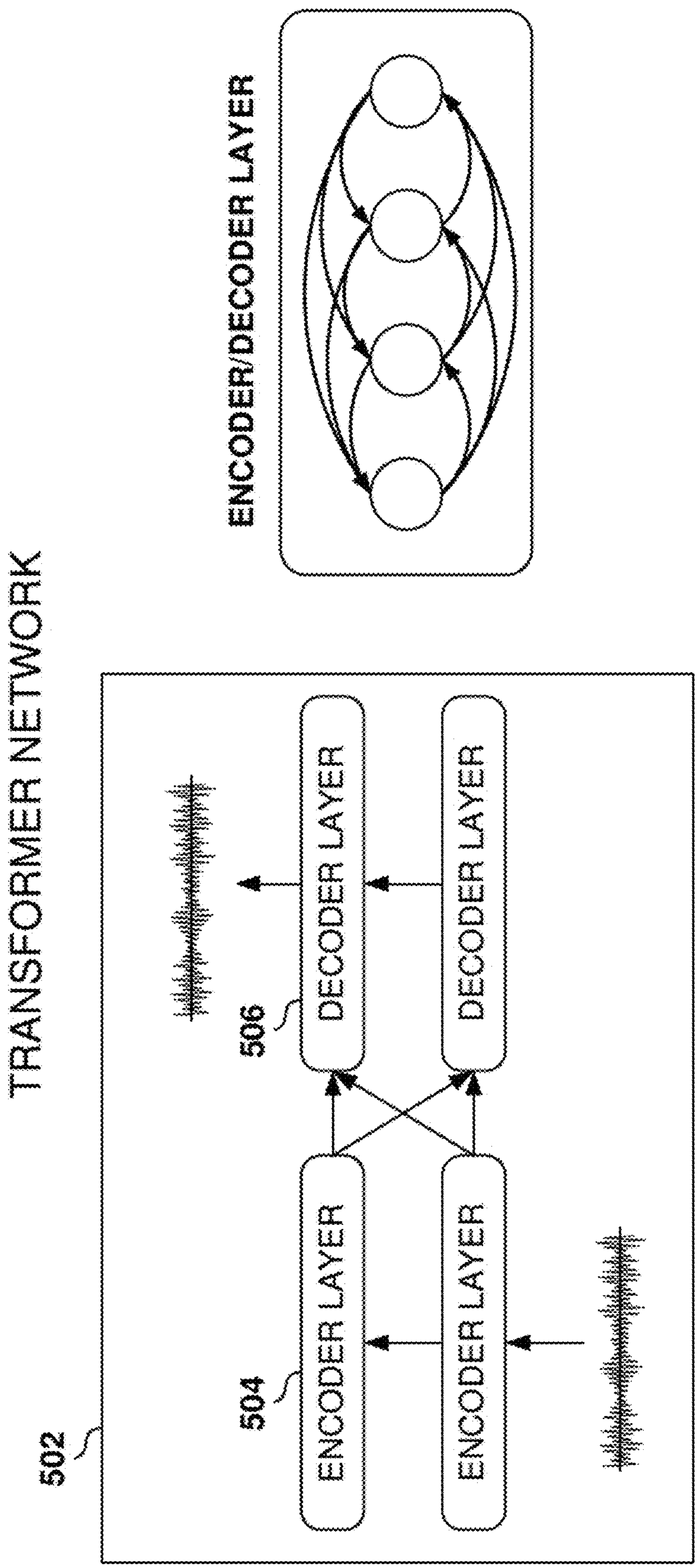
FIG. 5 illustrates the use of a transformer network, according to some example environments.

FIG. 5 illustrates the use of a transformer network 502, according to some example environments. Transformers use an attention-based encoder-decoder type architecture. Transformers use an attention mechanism so the transformer model can "attend" or "focus" on all previous tokens that have been generated, which enables the transformers to have extremely long-term memory. At a high level, the encoder 504 maps an input sequence into an abstract continuous representation that holds all the learned information of that input. The decoder 506 then takes that continuous representation and step by step generates a single output while also being fed the previous output.

Transfer learning (TL) is a machine-learning (ML) technique that focuses on storing knowledge gained while solving one problem and applying it to a different but related problem. For example, knowledge gained while learning to recognize cars could apply when trying to recognize trucks. From the practical standpoint, reusing or transferring information from previously learned tasks for the learning of new tasks has the potential to significantly improve the sample efficiency of a reinforcement learning agent.

In some example embodiments, the encoder 504 encodes the audio into a hidden representation, and then the decoder 506 goes through the hidden representation and outputs tokens when a word is in a region that contains PII.

FIG. 6 illustrates a sample output schema 602. The output schema may include different types of encoding of the text to identify the PII and/or the type of PII found.

In the illustrated example, the text obtained from the language processor is "i live in north hampton massachusetts." It's noted that the text is all in single case, but other types of processing may include text in upper and lowercase.

In some example embodiments, the output schema includes different types of data encoding:

- A plurality of different tags, also referred to as classes, each tag associated with a type of PII, e.g., name, location, state, phone number. In the example, two tags are identified: location and state. Each section of PII includes a beginning tag (e.g., <LOCATION>) and an ending tag (e.g., </STATE>) to delimit the text for the PII.
- A single tag for identifying PII (one class). In the illustrated example, the PII is delimited by the tags <PII> and </PII> and the PII text in between is "north hampton massachusetts."
- A tag for each PII (NE-Tag), selected from a plurality of tag types, but the text for the PII is omitted. In this example, two PII areas are identified: <LOCATION> and <STATE>.
- A single universal tag for the PII. In this case, the PII text is replaced by the universal tag <PII>.

In some example embodiments, the different types of output schema may be used for defining the training data.

Figure 7:
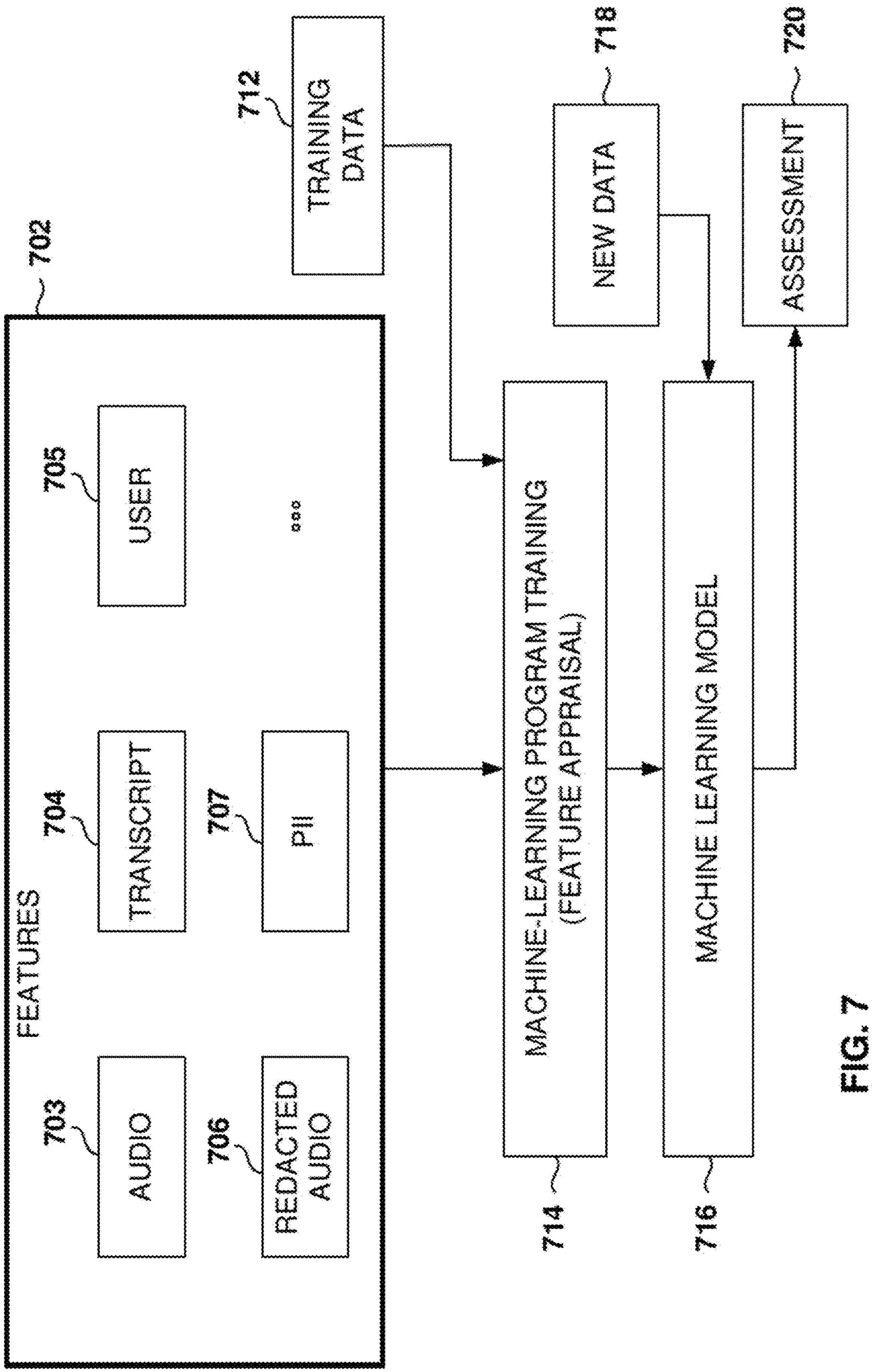
FIG. 7 illustrates the training and use of a machine-learning model, according to some example embodiments.

FIG. 7 illustrates the training and use of a machine-learning model, according to some example embodiments. In some example embodiments, machine-learning (ML) models 716 are utilized to perform operations associated with PII redaction and voice deidentification.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 716 from example training data 712 in order to make data-driven predictions or decisions expressed as outputs or assessments 720. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, example ML model 716 provide encoders and decoders for processing audio of conversations.

The training data 712 comprises examples of values for the features 702. In some example embodiments, the training data comprises labeled data with examples of values for the features 702 and labels indicating the outcome, such as PII detected. The machine-learning algorithms utilize the training data 712 to find correlations among identified features 702 that affect the outcome. A feature 702 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 702 may be of different types and may include one or more of audio of conversations 703, transcripts 704, user information 705, redacted audio 706, PII identified in the transcripts 707, etc.

During training 714, the ML program, also referred to as ML algorithm or ML tool, analyzes the training data 712 based on identified features 702 and configuration parameters defined for the training 714. The result of the training 714 is the ML model 716 that is capable of taking inputs to produce assessments.

Training an ML algorithm involves analyzing large amounts of data (e.g., from several gigabytes to a terabyte or more) in order to find data correlations. The ML algorithms utilize the training data 712 to find correlations among the identified features 702 that affect the outcome or assessment 720. In some example embodiments, the training data 712 includes labeled data, which is known data for one or more identified features 702 and one or more outcomes, such as PII detection, transcript of audio, and voice conversion.

The ML algorithms usually explore many possible functions and parameters before finding what the ML algorithms identify to be the best correlations within the data; therefore, training may make use of large amounts of computing resources and time.

When the ML model 716 is used to perform an assessment, new data 718 is provided as an input to the ML model 716, and the ML model 716 generates the assessment 720 as output.

Figure 8:
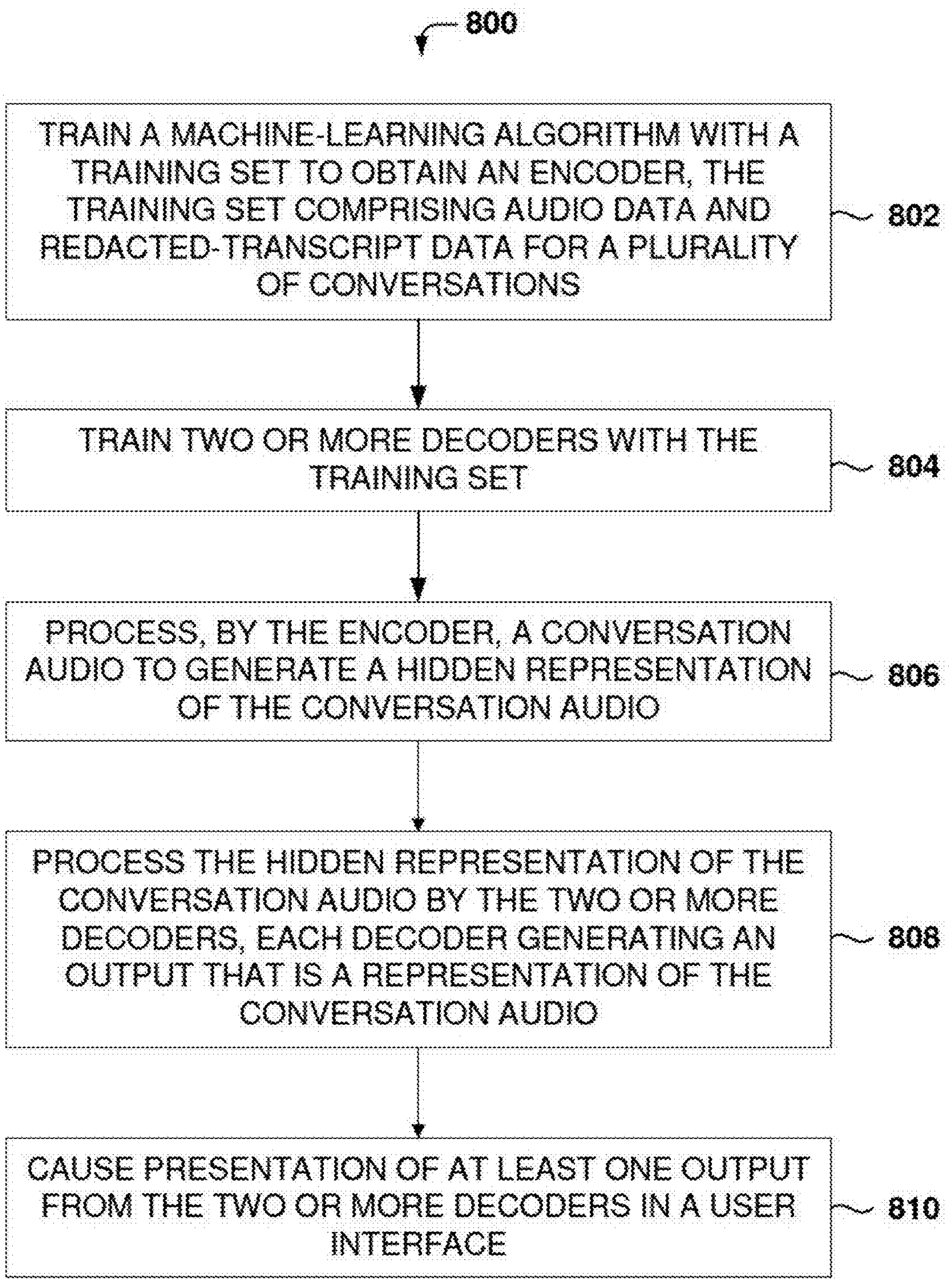
FIG. 8 is a flowchart of a method for redacting PII and deidentifying voice in a conversation, according to some example embodiments.

FIG. 8 is a flowchart of a method 800 for redacting PII and deidentifying voice in a conversation, according to some example embodiments. While the various operations in this flowchart are presented and described sequentially, one of ordinary skill will appreciate that some or all of the operations may be executed in a different order, be combined or omitted, or be executed in parallel.

At operation 802, a machine-learning algorithm is trained with a training set to obtain an encoder. The training set comprises audio data, transcript data, and redacted-transcript data for a plurality of conversations.

From operation 802, the method 800 flows to operation 804 to train two or more decoders with the training set.

Further, from operation 804, the method 800 flows to operation 806 for processing, by the encoder, a conversation audio to generate a hidden representation of the conversation audio.

From operation 806, the method 800 flows to operation 808 for processing the hidden representation of the conversation audio by the two or more decoders. Each decoder generates an output that is a representation of the conversation audio.

From operation 808, the method 800 flows to operation 810 for causing presentation of at least one output from the two or more decoders in a user interface.

In one example, processing the hidden representation of the conversation audio comprises processing, by a first decoder, the hidden representation of the conversation audio to generate a first transcript with text of the conversation audio.

In one example, processing the hidden representation of the conversation audio comprises processing, by a second decoder, the hidden representation of the conversation audio to generate a second transcript with text of the conversation audio with one or more embedded tags identifying personally identifiable information (PII).

In one example, processing the hidden representation of the conversation audio comprises processing, by a third decoder, the hidden representation of the conversation audio to generate a new audio of the conversation with PII removed from the new audio.

In one example, the new audio includes a voice change for one or more participants in the conversation audio.

In one example, converting the conversation audio to the new audio is performed by one machine-learning model without generating a text script of the conversation audio.

In one example, the training set includes one or more features selected from a group comprising audio of conversations, transcripts of conversations, information of users participating in the conversation, redacted audio of conversations, and identification of PII.

In one example, the hidden representation represents machine-readable data representations learned from a neural network's hidden layers.

In one example, the hidden representation is a multidimensional vector containing numbers.

In one example, the encoder maps an input sequence into an abstract continuous representation that holds learned information of the conversation audio input, where the decoder processes the continuous representation and generates a single output while also being fed a previous output.

Another general aspect is for a system that includes a memory comprising instructions and one or more computer processors. The instructions, when executed by the one or more computer processors, cause the one or more computer processors to perform operations comprising: training a machine-learning algorithm with a training set to obtain an encoder, the training set comprising audio data, transcript data, and redacted-transcript data for a plurality of conversations; training two or more decoders with the training set; processing, by the encoder, a conversation audio to generate a hidden representation of the conversation audio; processing the hidden representation of the conversation audio by the two or more decoders, each decoder generating an output that is a representation of the conversation audio; and causing presentation of at least one output from the two or more decoders in a user interface.

In yet another general aspect, a machine-readable storage medium (e.g., a non-transitory storage medium) includes instructions that, when executed by a machine, cause the machine to perform operations comprising: training a machine-learning algorithm with a training set to obtain an encoder, the training set comprising audio data, transcript data, and redacted-transcript data for a plurality of conversations; training two or more decoders with the training set; processing, by the encoder, a conversation audio to generate a hidden representation of the conversation audio; processing the hidden representation of the conversation audio by the two or more decoders, each decoder generating an output that is a representation of the conversation audio; and causing presentation of at least one output from the two or more decoders in a user interface.

Figure 9:
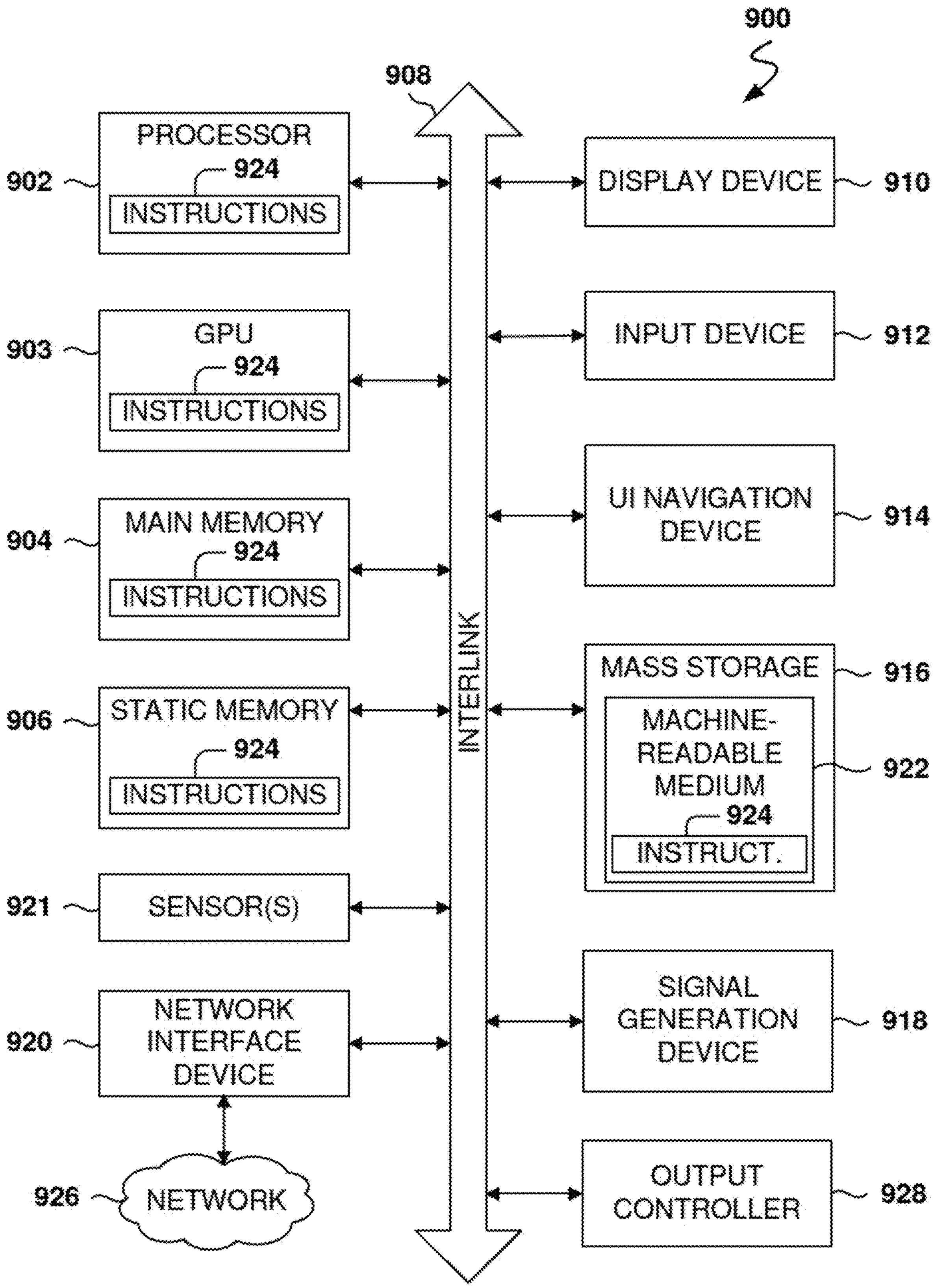
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

training, via machine-learning, an encoder and at least two decoders based on training data that includes audio data and redacted-transcript data that correspond to training conversations;

generating, by the encoder trained based on the training data used to train the at least two decoders, a representation of conversation audio, the representation being usable to transcribe the conversation audio, identify personally identifiable information (PII) in the conversation audio, and generate PII tags from the conversation audio;

processing, by a first decoder and a second decoder among the at least two decoders trained based on the training data used to train the encoder, the representation of the conversation audio, the first decoder outputting a conversation transcript tagged with the PII tags, the second decoder outputting redacted audio devoid of PII with a voice change for at least one participant in the conversation audio; and causing presentation, by a user interface, of at least one of the tagged conversation transcript or the redacted audio devoid of PII.

2. The method of claim 1, wherein the training of the encoder and the at least two decoders includes training a machine-learning algorithm based on the training data, the training of the machine-learning algorithm outputting the trained encoder and the at least two trained decoders.

3. The method of claim 1, wherein the generated representation of the conversation audio is a hidden representation that includes a multidimensional vector generated by the encoder for processing by the at least two decoders.

4. The method of claim 1, wherein the first decoder, by processing the generated representation of the conversation audio, generates the conversation transcript tagged with the PII tags.

5. The method of claim 1, wherein the second decoder, by processing the generated representation of the conversation audio, generates the redacted audio that is devoid of PII.

6. The method of claim 1, wherein the second decoder, by processing the representation of the conversation audio, generates the redacted audio with the voice change for the at least one participant in the conversation audio.

7. The method of claim 1, wherein the second decoder, by processing the generated representation of the conversation audio, generates the redacted audio without generating any text based on the conversation audio.

8. A system comprising:

one or more processors; and a memory comprising instructions that, when executed by the one or more processors, cause the system to perform operations comprising:

training, via machine-learning, an encoder and at least two decoders based on training data that includes audio data and redacted-transcript data that correspond to training conversations;

generating, by the encoder trained based on the training data used to train the at least two decoders, a representation of conversation audio, the representation being usable to transcribe the conversation audio, identify personally identifiable information (PII) in the conversation audio, and generate PII tags from the conversation audio;

processing, by a first decoder and a second decoder among the at least two decoders trained based on the training data used to train the encoder, the representation of the conversation audio, the first decoder outputting a conversation transcript tagged with the PII tags, the second decoder outputting redacted audio devoid of PII with a voice change for at least one participant in the conversation audio; and causing presentation, by a user interface, of at least one of the tagged conversation transcript or the redacted audio devoid of PII.

9. The system of claim 8, wherein the training of the encoder and the at least two decoders includes training a machine-learning algorithm based on the training data, the training of the machine-learning algorithm outputting the trained encoder and the at least two trained decoders.

10. The system of claim 8, wherein the generated representation of the conversation audio is a hidden representation that includes a multidimensional vector generated by the encoder for processing by the at least two decoders.

11. The system of claim 8, wherein the first decoder, by processing the representation of the conversation audio, generates the conversation transcript tagged with the PII tags.

12. The system of claim 8, wherein the second decoder, by processing the generated representation of the conversation audio, generates the redacted audio that is devoid of PII.

13. The system of claim 8, wherein the second decoder, by processing the generated representation of the conversation audio, generates the redacted audio with the voice change for the at least one participant in the conversation audio.

14. The system of claim 8, wherein the second decoder, by processing the generated representation of the conversation audio, generates the redacted audio without generating any text based on the conversation audio.

15. A non-transitory machine-readable medium comprising instructions that, when executed by one or more processors, cause the one or more processors to perform operations comprising:

training, via machine-learning, an encoder and at least two decoders based on training data that includes audio data and redacted-transcript data that correspond to training conversations;

generating, by the encoder trained based on the training data used to train the at least two decoders, a representation of conversation audio, the representation being usable to transcribe the conversation audio, identify personally identifiable information (PII) in the conversation audio, and generate PII tags from the conversation audio;

processing, by a first decoder and a second decoder among the at least two decoders trained based on the training data used to train the encoder, the representation of the conversation audio, the first decoder outputting a conversation transcript tagged with the PII tags, the second decoder outputting redacted audio devoid of PII with a voice change for at least one participant in the conversation audio; and causing presentation, by a user interface, of at least one of the tagged conversation transcript or the redacted audio devoid of PII.

16. The non-transitory machine-readable medium of claim 15, wherein the training of the encoder and the at least two decoders includes training a machine-learning algorithm based on the training data, the training of the machine-learning algorithm outputting the trained encoder and the at least two trained decoders.

17. The non-transitory machine-readable medium of claim 15, wherein the generated representation of the conversation audio is a hidden representation that includes a multidimensional vector generated by the encoder for processing by the at least two decoders.

18. The non-transitory machine-readable medium of claim 15, wherein the first decoder, by processing the representation of the conversation audio, generates the conversation transcript tagged with the PII tags.

19. The non-transitory machine-readable medium of claim 15, wherein the second decoder, by processing the generated representation of the conversation audio, generates the redacted audio that is devoid of PII.

20. The non-transitory machine-readable medium of claim 15, wherein the second decoder, by processing the generated representation of the conversation audio, generates the redacted audio with the voice change for the at least one participant in the conversation audio.

* * * * *